June 10, 1930.  W. SCHENKER  1,762,425
CYLINDER FOR INTERNAL COMBUSTION ENGINES
Filed April 16, 1928
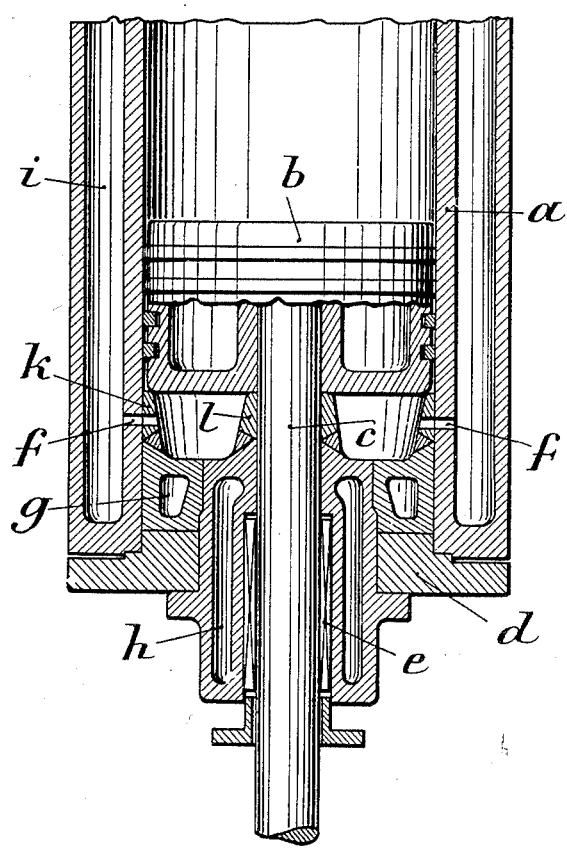
INVENTOR:
Walter Schenker
BY
ATTORNEYS

UNITED STATES PATENT OFFICE

WALTER SCHENKER, OF WINTERTHUR, SWITZERLAND, ASSIGNOR TO THE FIRM: SULZER FRÈRES SOCIÉTÉ ANONYME, OF WINTERTHUR, SWITZERLAND

CYLINDER FOR INTERNAL-COMBUSTION ENGINES

Application filed April 16, 1928, Serial No. 270,237, and in Switzerland May 7, 1927.

This invention relates to cylinders for double-acting internal combustion engines of the kind in which an internal circumferential ring to prevent overheating of the cylinder is disposed within the clearance space at the end of the cylinder adjacent the crankshaft.

According to the present invention the ring, which is made of refractory metal, is welded to a member forming part of the adjacent cylinder head so as to make a heat-conducting joint therewith and thus obviate the need for separate cooling means for the ring itself. Preferably a second heat shielding ring of refractory metal is disposed within the same clearance space so as to surround the piston rod and protect it from heat, this second ring being also welded to the adjacent cylinder head so as to make a heat-conducting joint therewith. The rings may be made of any desired metal capable of withstanding high temperatures but preferably a chromium steel alloy is used in their manufacture and the rings are conveniently welded to the cylinder head with the aid of chromium steel electrodes.

One construction according to the invention is illustrated diagrammatically by way of example in the accompanying drawing in which the cylinder of a double-acting two-stroke internal combustion engine is shown in cross-sectional elevation.

In the construction illustrated in the drawing the cylinder $a$ within which the piston $b$ reciprocates, is provided with a water jacket $i$ and a cylinder head group comprising a cover plate $d$ carrying a stuffing box $e$ attached thereto for the passage therethrough of the piston rod, the cover plate $d$ also carrying or being associated with another member for cooling it in the usual manner by means of the channel $g$. The stuffing box is also provided with cooling channels $h$, in the well known manner.

The openings $f$ for the reception of the fuel, starting air, and other valves, instead of being disposed in the cylinder cover, as is usual in the case of the end of the cylinder remote from the crankshaft, are arranged in that part of the cylinder wall which surrounds the clearance space.

The part of the cylinder wall in which the openings are made is protected by an internal circumferential heat shielding ring $k$ made of a chromium steel alloy capable of withstanding very high temperatures. This ring prevents excessive heat from reaching the cylinder wall and is welded to the usual cooling member forming part of the cylinder head group and having a channel $g$ (see drawing) in order that the heat taken up by the ring may be transferred by conduction to the cooling water in the space $g$. The welding is preferably carried out electrically with the aid of chromium steel electrodes.

In addition to the ring $k$ a second heat shielding ring $l$ formed of the same material is disposed round that part of the piston rod $c$ which is situated within the clearance space, in order to protect the piston rod from the effects of overheating. This ring $l$ is also welded to a member forming part of the cylinder head group, in this case being the stuffing box gland, so as to transfer heat to the cooling water in the space $h$.

In this way both the cylinder wall and the piston rod in the neighbourhood of the clearance space are protected from the oxidizing effects of the very high temperatures which arise during the cycle of operations.

I claim:

1. In a cylinder for double-acting internal combustion engines, a clearance space at the end of the cylinder facing the crankshaft, a circumferential ring of refractory metal disposed in said clearance space and welded to a member carried by the adjacent cylinder head and making a heat conducting-joint therewith and a second ring of refractory metal disposed within said clearance space and welded to another member forming a part of the cylinder head group so as to make a heat-conducting joint therewith, said second ring surrounding the piston rod and protecting it from heat.

2. In a cylinder for double-acting internal combustion engines, a clearance space at the end of the cylinder facing the crankshaft, a circumferential ring of refractory metal disposed in said clearance space adjacent the wall of the cylinder and a second ring of refractory metal disposed within said clearance space adjacent the piston rod, said rings being made of a chromium steel alloy and welded to the cylinder head.

3. In a double acting internal combustion engine having a cylinder provided with a clearance space at the end facing the crank shaft, an annular heat-shielding ring of refractory metal disposed in said clearance space contiguous to the wall of the cylinder and welded to a member carried by the adjacent cylinder head, said ring being adapted to deflect heat from the wall of the cylinder and to conduct it to the cylinder head by way of said weld.

In testimony whereof I have affixed my signature.

WALTER SCHENKER.